(12) United States Patent
Parker et al.

(10) Patent No.: US 11,079,130 B2
(45) Date of Patent: Aug. 3, 2021

(54) WEATHER RESPONSIVE SMART VENTILATION SYSTEM USING MULTIPLE OPTIMIZATION PARAMETERS

(71) Applicant: University of Central Florida Research Foundation, Inc., Orlando, FL (US)

(72) Inventors: Danny Parker, Orlando, FL (US); Eric Martin, Orlando, FL (US); Karen Fenaughty, Orlando, FL (US); David A. Chasar, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 99 days.

(21) Appl. No.: 16/571,986

(22) Filed: Sep. 16, 2019

(65) Prior Publication Data

US 2020/0088429 A1 Mar. 19, 2020

Related U.S. Application Data

(60) Provisional application No. 62/731,149, filed on Sep. 14, 2018.

(51) Int. Cl.
*F24F 11/30* (2018.01)
*F24F 7/007* (2006.01)
(Continued)

(52) U.S. Cl.
CPC ............. *F24F 11/30* (2018.01); *F24F 7/007* (2013.01); *F24F 11/64* (2018.01); *F24F 11/65* (2018.01);
(Continued)

(58) Field of Classification Search
CPC .. F24F 11/30; F24F 11/64; F24F 11/65; F24F 7/007; F24F 13/08; F24F 2110/20;
(Continued)

(56) References Cited

U.S. PATENT DOCUMENTS

| 2014/0278165 A1* | 9/2014 | Wenzel | ............. G06Q 10/0639 702/61 |
| 2015/0006127 A1* | 1/2015 | An | ........................ G06Q 50/06 703/2 |

FOREIGN PATENT DOCUMENTS

| CN | 107120804 A | * | 9/2017 |
| CN | 108413580 A | * | 8/2018 |

(Continued)

OTHER PUBLICATIONS

Okuyama, Simplified ventilation air volume estimation method and simplified ventilation air volume estimation device in a plurality of zones, 2009, google patents pp. 1-21 (Year: 2009).*

(Continued)

*Primary Examiner* — Rocio Del Mar Perez-Velez
*Assistant Examiner* — Yvonne Trang Follansbee
(74) *Attorney, Agent, or Firm* — Smith & Hopen, P.A.; Paul Murty (57) ABSTRACT

A smart ventilation system which uses outdoor temperature and moisture to optimize control of the system. The main principle is to shift ventilation from time periods that have large indoor-outdoor temperature and moisture differences to periods when these differences are smaller, and their energy and comfort impacts are expected to be less. Fan flow rates are reduced when the outside temperature and moisture falls outside of optimum levels, yet overall air exchange is maintained to ensure chronic and acute exposure to pollutants remains relative to best practice. Online weather and smart thermostat data can be used as control inputs, so no (Continued)

specific measurement devices are needed to control ventilation fans.

16 Claims, 4 Drawing Sheets
(4 of 4 Drawing Sheet(s) Filed in Color)

(51) Int. Cl.
      *F24F 11/64*        (2018.01)
      *F24F 11/65*        (2018.01)
      *F24F 13/08*        (2006.01)
      *G05B 13/04*       (2006.01)
      *F24F 130/10*       (2018.01)
      *F24F 110/10*       (2018.01)
      *F24F 110/12*       (2018.01)
      *F24F 110/20*       (2018.01)
      *F24F 110/22*       (2018.01)
      *F24F 120/10*       (2018.01)
(52) U.S. Cl.
      CPC ............ *F24F 13/08* (2013.01); *G05B 13/042* (2013.01); *F24F 2110/10* (2018.01); *F24F 2110/12* (2018.01); *F24F 2110/20* (2018.01); *F24F 2110/22* (2018.01); *F24F 2120/10* (2018.01); *F24F 2130/10* (2018.01)
(58) Field of Classification Search
      CPC ............... F24F 2120/10; F24F 2110/22; F24F 2130/10; F24F 2110/10; F24F 2110/12; G05B 13/042
      See application file for complete search history.

(56) References Cited

FOREIGN PATENT DOCUMENTS

| JP | 2009052922 A | * | 3/2009 |
| JP | 2016109408 A | * | 6/2016 |

OTHER PUBLICATIONS

Youxin, Air-conditioner control method, device and readable storage medium storing program for executing, air conditioner, 2018, google patents pp. 1-14 (Year: 2018).*

Ruijia, Control method of air device, air conditioner indoor unit, air conditioner and air purification equipment, 2017, google patents pp. 1-12 (Year: 2017).*

Yoshio, Ventilation fan having control function based on difference between indoor and outdoor temperature and difference between indoorand outdoor humidity, 2016, google patents pp. 1-6 (Year: 2016).*

D'Agostino and Parker. A framework for the cost-optimal design of nearly zero energy buildings (NZEBs) in representative climates across Europe. Energy. 2018. vol. 149: 814-829.

Dimitroulopoulou. Ventilation in European Dwellings: A review. Building and Environment. 2012. vol. 47: 109-125.

Guyot et al., Performance based approaches in standards and regulations for smart ventilation in residential buildings: a summary review. International Journal of Ventilation. Ernest Orlando Lawrence Berkeley National Laboratory. 2018: 1-26.

Kunkel et al., Indoor Air Quality, Thermal Comfort and Daylight: Analysis of Residential Building Regulations in Eight EU Member States. Buildings Performance Institute Europe (BPIE). Brussels. 2015: 1-101.

Less et al., Smart Ventilation Control of Indoor Humidity in High Performance Homes in Humid U.S. Climates. Ernest Orlando Lawrence Berkeley National Laboratory. LBNL-1006980, Berkeley, CA. 2016: 1-13.

Less et al., Development of an Outdoor Temperature Based Control Algorithm for Residential Mechanical Ventilation Control. Ernest Orlando Lawrence Berkeley National Laboratory. LBNL-6936E, Berkeley, CA. 2014: 1-81

Parker et al., Flexible Residential Test Facility: Impact of Infiltration and Ventilation on Measured Cooling Season Energy and Moisture Levels, Golden, CO. National Renewable Energy Laboratory. NREL/SR-5500-61012.2014: 1-53.

Sherman and Walker. Meeting Residential Ventilation Standards through Dynamic Control of Ventilation Systems. Energy and Buildings. 2011. vol. 43: 1904-1912.

Sherman et al., Equivalence in ventilation and indoor air quality. Ernest Orlando Lawrence Berkeley National Laboratory. 2011: 1-26.

Rudd. Expert Meeting: Recommended Approaches to Humidity Control in High Performance Homes. Somerville, MA: Building Science Corporation. Golden, CO: National Renewable Energy Laboratory, 2013: 1-44.

Vieira and Beal. Residential Performance Code Methodology for Crediting Dehumidification and Smart Vent Applications Final Report. Florida Solar Energy Center 2017. FSEC-CR-2067-17: 1-72.

Rudd et al., Residential Dehumidification Systems Research for Hot-Humid Climates. Golden, CO: National Renewable Energy Laboratory, NREL/SR-550-36643. 2005: 1-42.

Martin. Impact of Residential Mechanical Ventilation on Energy Cost and Humidity Control. Building Science Corporation, Florida Solar Energy Center, and IBACOS. 2014 . . . Golden, CO. National Renewable Energy Laboratory. NREL/SR-5500-60675: 1-47.

* cited by examiner

WEATHER RESPONSIVE SMART VENTILATION SYSTEM USING MULTIPLE OPTIMIZATION PARAMETERS

CROSS-REFERENCE TO RELATED APPLICATIONS

This nonprovisional application is a continuation of and claims priority to provisional application No. 62/731,149, entitled "Weather responsive smart ventilation system using multiple optimization parameters," filed Sep. 14, 2018, by the same inventors.

FEDERALLY SPONSORED RESEARCH OR DEVELOPMENT

This invention was made with Government support under Grant No. (DE-EE0007056) DE-FOA-0001117 awarded by the U.S. Department of Energy. The government has certain rights in the invention.

BACKGROUND OF THE INVENTION

1. Field of the Invention

This invention relates, generally, to heating, ventilation, and air conditioning (HVAC) systems. More specifically, it relates to an HVAC system and method for optimizing ventilation according to outdoor temperature and/or humidity levels.

2. Brief Description of the Prior Art

Whole-house mechanical ventilation is a critical component to a comprehensive strategy for good indoor air quality (IAQ). However, continuous delivery of outdoor air has potential to impact energy use and comfort, and presents a barrier to installation and operation of compliant systems. Smart ventilation controls (SVC) help reduce risk factors by optimizing mechanical ventilation operation to reduce the heating and/or cooling loads and improve comfort while maintaining IAQ equivalence according to ASHRAE Standard 62.2 (Sherman, Walker, and Logue 2012).

Previous studies by Lawrence Berkeley National Laboratory (LBNL) have incorporated smart ventilation strategies that include the effects of other fans operating in the home as well as passive ventilation systems (Sherman and Walker 2011). These studies include a ventilation model having control algorithms and IAQ calculations suitable for evaluating performance of variable ventilation rate systems. LBNL used these simulations to develop a smart ventilation algorithm based on a temperature threshold (Less, Walker, and Tang 2014). Recently, LBNL simulations have been used to investigate the effect of smart ventilation control on indoor relative humidity (RH) (Less and Walker 2016). Until now, no prior published research on lab or field testing of smart ventilation control systems has been available.

LBNL's work on ventilation equivalence for intermittent ventilation systems was adopted by ASHRAE Standard 62.2-2016. The ASHRAE Standard provides a procedure to calculate pollutant exposure resulting from varying ventilation rates, relative to a continuous rate, and was termed "relative exposure" (RE). Averaged exposure over a chosen time period achieving a value of 1.0 dictates that exposure to pollutants is equivalent to a continuously operating mechanical ventilation system. At no time can a time-varying ventilation system produce a RE value that exceeds five times the baseline.

In Europe, ventilation standards vary from one country to the next, but tend to be somewhat greater than that shown by ASHRAE Standard 62-2 (Kunkel et al., 2015). Demand Controlled Ventilation (DCV) schemes have been widely advocated as a method to achieve energy-related savings, although not with a weather-responsive scheme to improve IAQ. Tight construction and Energy Recovery Ventilators (ERV's) are commonly used.

In all locations globally, optimizing ventilation according to outdoor temperature is desirable. However, in humid locations, outdoor moisture levels are a legitimate concern for ventilation since outdoor dew points are frequently above 21.1° C. Although enthalpy heat recovery is advocated in efficient home design, taking advantage of the natural daily and seasonal temperature and humidity cycles can provide further comfort and energy reduction advantages. Recent research results show that these savings in annual heating and cooling energy vary with location, but are typically 5-20% of the loads from compliant constant ventilation. Given the simplicity of the SVC systems, this level of savings is highly attractive.

Typically, air conditioning system controls respond to sensible heat load. Thermostats include a set-point at which the thermostat calls for cooling. The resulting latent (moisture) removal depends on machine capacity, runtime, coil temperature, and air flow rate. Typical vapor compression air conditioners devote 25% of their capacities to removing moisture and 75% of their capacities to removing sensible heat (sensible heat ratio (SHR)=0.75). However, air conditioners may function differently if the load is, for example, 60% sensible and 40% latent.

Currently there are a myriad of ways to supplement the removal of excess latent heat, with varying cost and efficiency, as explained in the table below:

| System | Cost | Pros | Cons |
|---|---|---|---|
| Overcooling | $0 | Low first cost. User control. | Results in cold clammy comfort. No help in swing season. Energy inefficient. |
| Lowering fan speed | $0-$75 | Improves dehumidification. | Some loss in cooling efficiency. No help in swing season. |
| Heat pipes | $3000 | Long life, low maintenance. | Requires space. No help in swing season. |
| Enthalpy recovery ventilation | $700-$1400 | Can reduce load from ventilation. Balanced house pressure possible. | Extra energy to run the two fans needed. No help in swing season. |

-continued

| System | Cost | Pros | Cons |
| --- | --- | --- | --- |
| Two-speed air conditioner | $1800 | Low speed can result in lower energy use. | Higher first cost. Still some hours swing season it will not operate. |
| Dedicated outdoor air system | $3200-$7000 | Excellent ventilation RH control and effectiveness potential. | High first cost. |
| Stand-alone dehumidifier | $150-$2000 | Works with or without AC. | Energy-inefficient. Adds heat. Some RH dead bands can be excessive. Noise may be issue. |
| Integrated ducted dehumidifier | $1000-2000 | Works with or without AC. Good RH control. Air is distributed better than stand-alone. | Energy inefficient. Adds heat, some RH dead bands have been found excessive |
| Sub-cooling/Full-condensing reheat | $1600-$1750 | Good RH control. More efficient than dehumidifiers. | Overcools and then heats, using energy for both. High first cost. |

Supplemental dehumidification is often required in high performance homes in humid climates, irrespective of mechanical ventilation rates, in order to control indoor humidity year round. Homes using supplemental dehumidification strategies are able to reduce, but not eliminate the hours of indoor relative humidity above 60% (e.g., on average, the hours of indoor relative humidity above 60% can be reduced from around 30% of annual hours to 15% of annual hours; dehumidifier capacity and set points interact such that all high humidity hours are not eliminated). Less and Walker estimated that supplemental dehumidifiers in high performance homes operate 10% of the year and require 170 kWh per year with a 60% RH set point, and 5 times higher with a 50% set point. (Less and Walker 2016).

Accordingly, what is needed is a system and method for conditioning indoor air that accounts for natural daily and seasonal temperature and humidity cycles to provide further comfort and energy reduction advantages. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a method of optimizing ventilation flow rates is now met by a new, useful, and nonobvious invention.

The novel method includes a step of providing a numerical value corresponding to a difference in an outdoor temperature and an indoor temperature over a predetermined time period. A numerical value corresponding to a difference in an outdoor moisture level and an indoor moisture level is also provided over the predetermined time period. The indoor temperature and moisture levels are measured in a building that is subject to an air conditioning system employing the steps of optimizing ventilation flow rates. In an embodiment, one or more of the provided outdoor temperature and moisture level is measured in an environment surrounding the building.

The method includes a step of calculating a residual sum of squares for the difference between indoor and outdoor temperatures and the difference between indoor and outdoor moisture levels. The residual sum of squares may be weighted in favor of either the temperature values or the moisture level values; in an embodiment, the residual sum of squares is time-weighted, with a 2:1 weight assigned between the temperature difference value and the moisture level difference value.

In an embodiment, the residual sum of squares for each predetermined time period is used in a calculation of an average residual sum of squares, such as when there is at least a first predetermined time period and a second predetermined time period. The average time-based (i.e., hourly) fan flow shifts ventilation from time periods with greater indoor-outdoor temperature and moisture differences to time periods with smaller indoor-outdoor temperature and moisture differences.

The method includes a step of calculating a time-based fan flow equal to a target fan flow multiplied by the residual sum of squares. In an embodiment, the target fan flow is a cooling period target fan flow that is triggered when the outdoor temperature becomes greater than a cooling threshold temperature. In another embodiment, the target fan flow is a heating period target fan flow that is triggered when the outdoor temperature becomes less than a heating threshold temperature. In yet another embodiment, the target fan flow is a floating period target fan flow that is triggered when the outdoor temperature resides between a heating threshold temperature and a cooling threshold temperature. The target fan flow level may be set to zero based on a determination that a provided outdoor temperature is greater than about 30° C.

An object of the invention is to optimize ventilation flow rates by measuring differences between indoor and outdoor temperatures and indoor and outdoor moisture levels, such that ventilation fans are more efficient by running during period of smaller differences between indoor and outdoor conditions.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawings will be provided by the Office upon request and payment of the necessary fee.

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a system and method for varying mechanical ventilation airflow through interpretation of current and historical outdoor temperature and absolute humidity (W). The main principle is to shift ventilation from time periods that have large indoor-outdoor temperature and moisture differences to periods when these differences are smaller, and their energy and comfort impacts are expected to be less. Fan flow rates are reduced when the outside temperature and moisture falls outside of optimum levels, yet overall air exchange is maintained to ensure chronic and acute exposure to pollutants remains relative to best practice. Online weather and smart thermostat data can be used as control inputs, so no specific measurement devices are needed. The system produces energy savings, improved resident comfort, and reduced exposure to pollutants.

The system includes an HVAC system that is adapted to optimize delivery of mechanical ventilation airflow on a daily and seasonal cycle to minimize sensible and latent load impacts. The experimental results showed large potential cooling savings, which can be realized through systems without heat recovery in summer (known as a "summer bypass" within certain mechanical ventilation heat recovery units). The calculations provided below emphasize that new ERV designs including bypass heat recovery are particularly useful during summer nights when outdoor temperatures allow for high efficiency cooling at a fraction of the energy needed for vapor compression air conditioning. Thus, an embodiment of the present invention can be used with a new line of ERVs that significantly reduces cooling needs with intelligent control using summer bypass.

As will be shown herein, the system was simulated by tuning differing flow targets and seasonal adjustment factors in order to:
1) maximize heating and cooling energy savings compared to continuous ventilation;
2) maintain similar indoor RH; and
3) achieving equivalent RE with respect to ventilation standards.

An embodiment of the present invention examines a 24-hour period preceding a testing period, and compares the recursively weighted hours of the 24-hour period with a current hour of the testing period, seeking to minimize the sum of the square deviations from multiple targets: the difference between indoor and outdoor temperature, and the difference between indoor and outdoor humidity (W). If desired, a weight can be assigned to each parameter (X) to increase the sensitivity of the algorithm toward a particular parameter to account for local differences in climate, such as moisture and temperature differences over day-to-day periods or over seasonal periods. The time weighted RSS (residual sum of squares) can be calculated using:

$$\text{RSS} = \sqrt{(\Delta T^* X_T)^2 + (\Delta W^* X_W)^2} \qquad (1)$$

where $\Delta T$ (° F.)=(indoor temperature)−(outdoor temperature); $X_T$=delta temperature weight; $\Delta W$ (g/m$^3$)=(indoor moisture)−(outdoor moisture); and $X_W$=delta moisture weight.

The time weighted RSS (Average $(RSS_1:RSS_{23})/RSS_{24}$) becomes a multiplier to adjust total ventilation flow (mechanical+natural), which is proportional to RE. An embodiment includes other constraints to ventilation that could be optimized with this multi-parameter optimization approach. For instance, utilities are very concerned with minimizing HVAC loads during system generation peaks that often come in late afternoon in summer and early morning hours in winter. In addition, an embodiment may consider resident occupancy factors and habits, such as whether an occupant current resides in a particular building, and an occupant's appliance usage that contributes to indoor temperature and humidity values.

A simulation tool was developed and used to test the present invention's ability to reduce ventilation loads using typical meteorological year (TMY3) weather data. The simulation tool enabled consideration of both backward and backward/forward differencing schemes in performing the control. The backward/forward differencing scheme assessed 24 hours of weather data in both directions and was evaluated by imagining that the future weather forecasts of temperature and W (perhaps made available via online weather forecast) were perfect. The simulation was also conducted with expanded backward and forward time periods. Surprisingly, all show similar ventilation load reductions—likely due to the slow change in weather patterns and the fact that an algorithm that looks back 24 hours continuously will quickly catch up with changes to current weather. Similar results were found in multiple climates, leading to the conclusion that the seasonal shape of the typical or average daily weather pattern is likely more predictive of variable ventilation savings than are short term periods. Therefore, to enhance potential for savings, seasonal adjustment factors were determined iteratively using the simulation tool to ensure the RE target is achieved. The adjustment factors considered include changes to the target ventilation flow and flow overrides based on outdoor temperature and moisture, described as follows:

Hourly Fan Flow=(Target Fan Flow*(Average($RSS_1$: $RSS_{23}$)/$RSS_{24}$))     (2)

where flow targets can vary as follows:
Cooling period target if outdoor temperature >given threshold
Heating period target if outdoor temperature <given threshold
Floating period target if outdoor temperature is in between cooling and heating thresholds Total ventilation flow (mechanical+natural) was initially utilized as the target, because total ventilation flow is inversely proportional to RE. However, mechanical ventilation fan flow was ultimately used as the target. By capping the algorithm's output at maximum fan flow, it was possible to count any natural infiltration occurring at that time on top of the fan flow (with consideration given to interactive effects occurring with unbalanced ventilation systems). Parametric simulations allow for fine tuning of the adjustment factors to achieve a predicted annual average RE of 1.

Phase I Scheme Description and Results

Parametric simulations were conducted to arrive at an optimized set of parameters to later test in the laboratory (Table 1). The logic for the chosen flow targets for Phase I were cooling energy savings-focused: the maximum floating season flow target was set at the capacity limit of the fan, the Standard 62.2 continuous fan flow value for the laboratory building was assigned for Florida's limited heating season target, and the cooling season target was dropped below the heating season target by 9.4 L/s (volumetric flow rate). Simulation results showed temperature to be a much greater influence on energy savings than moisture, so the temperature and moisture parameters were weighted in a 2:1 ratio. The indoor temperature target is set intentionally below a typical thermostat set point temperature, since simulations showed such a low value required to generate an algorithm response that would result in cooling energy savings. The indoor W target of 12 g/m$^3$ corresponds to an RH of 55% at 23.9° C.

TABLE 1

Phase I scheme parameters and values

| Period Temp.) (defined by hourly outdoor | Parameter | Phase I Scheme Values |
|---|---|---|
| Cooling | Outdoor temp. range for cooling period target | >22° C. |
|  | Cooling period target fan flow | 26 L/s |
|  | Outdoor temp. range for fan lockout (0 L/s) | n/a |
| Heating | Outdoor temp. range for heating period target | <15.6° C. |
|  | Heating period target fan flow | 35.4 L/s |
| Floating | Outdoor temp. range for floating period target | ≤22° C.; ≥15.6° C. |
|  | Floating period target fan flow | 65 L/s (fan limit) |
| All | Indoor temp. | 18° C. |
|  | Delta-temp. weight ($X_T$) | 2 |
|  | Indoor moisture (W) | 12 g/m$^3$ |
|  | Delta-moisture weight ($W_W$) | 1 |

Phase I Simulation Results

Simulation results for the smart ventilation scheme chosen for Phase I, using TMY3 (Typical Meteorological Year, third edition) Orlando weather data, resulted in an average annual fan flow of 37.2 L/s, slightly higher than the 62.2 Standard continuous fan flow requirement of 35.4 L/s. Hourly fan flow ranged from 8.0 L/s to the upper-limit of the laboratory fan, 65 L/s. Total annual average ventilation rate was 38 L/s, determined hourly by adding the modified natural infiltration to the fan component. Annual RE averaged 1.08, reaching a maximum of 2.09 for a single hour, well below the 5.00 threshold provided by the 62.2 standard. The simulation results are displayed graphically in FIG. 1. Hourly fan flow of the smart ventilation system is plotted in light blue with average daily RE in red. The black line represents the 62.2 constant fan flow recommended for the buildings at 8.0 L/s and an associated RE of 1.00.

Figure 1:
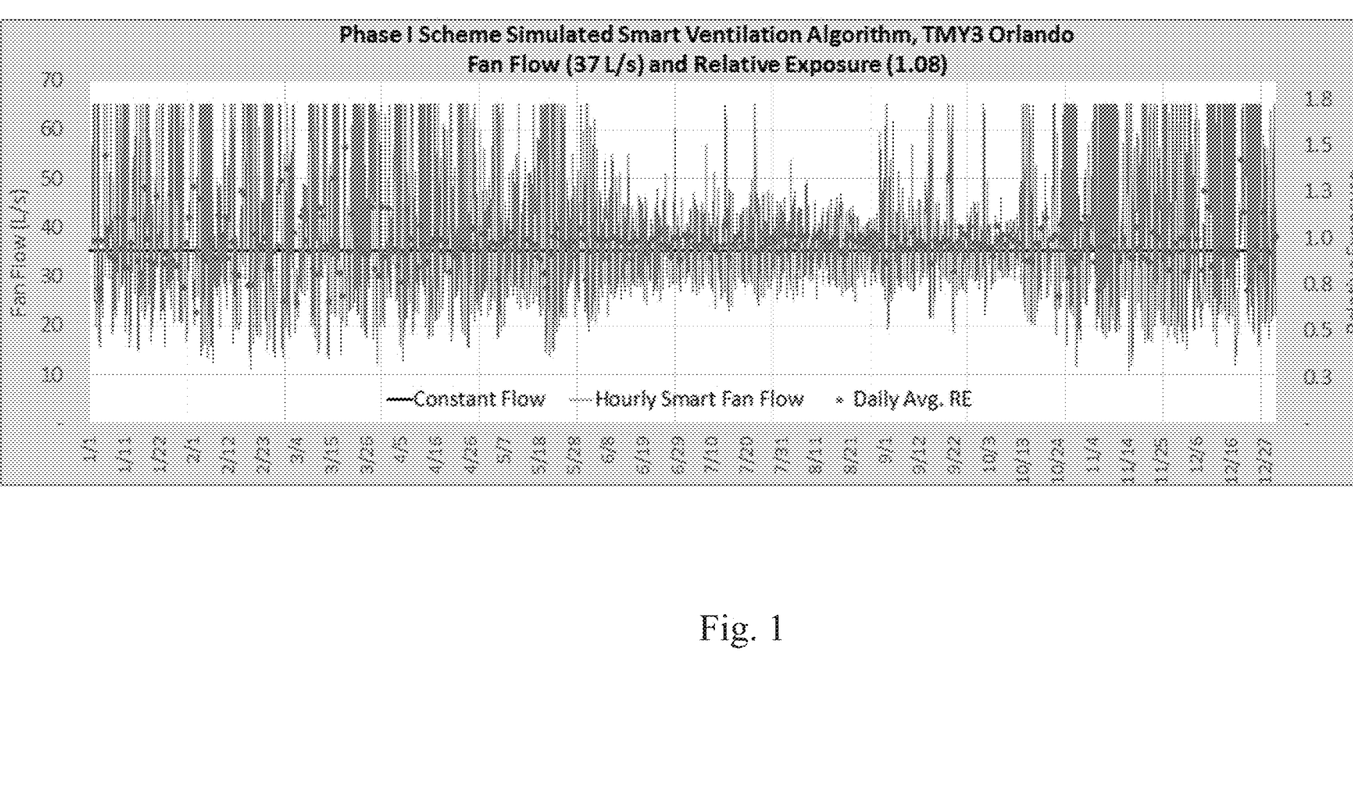
FIG. 1 is a graph of the phase I smart ventilation scheme simulated hourly average fan flow and daily average RE.

The plot in FIG. 1 shows two dominant seasons: cooling and floating. The smart ventilation algorithm creates a dynamic fan response, especially from May-October with the fan frequently flowing at its maximum when outdoor conditions are ideal, often at night. The increased floating period fan flow accommodates the restricted cooling period flow, balancing out the annual average RE, with the goal of generating cooling energy savings.

Simulated seasonal differences in sensible and latent ventilation load between the constant or fixed fan scheme and this smart ventilation scheme are presented in Table 2. Negative numbers in the table represent heat or moisture leaving the building, positive numbers represent heat or moisture entering the building. Compared to a fixed fan, the simulation suggests that, on an hourly average, the smart ventilation scheme delivers 52 W/h less heat (reducing cooling load) and 0.17 kg less moisture to the building in summer. On average, more heat is also removed during the non-summer floating hours as well, which is beneficial in the hot humid climate and could act to further reduce cooling hours later in the day by pre-cooling the building. However, slightly more moisture is introduced on average by the smart ventilation system (0.08 kg/h) than with the constant fan.

buildings (volume=370 m$^3$), including details of the general instrumentation package and schedule and methods for

TABLE 2

Simulated ventilation load and fan power for the Phase I scheme and continuous ventilation.

| | Sensible (W) | | | Latent (kg/h) | | | Fan Power (Average Watts) | | | Average for Smart System | |
|---|---|---|---|---|---|---|---|---|---|---|---|
| Season/Period | Fixed | Smart | Δ | Fixed | Smart | Δ | Fixed | Smart | Δ | Flow (L/s) | RE |
| Summer$^a$ | 73 | 20 | 52 | 0.85 | 0.68 | 0.17 | 40 | 28 | 12 | 31 | 1.24 |
| Non-Summer Cooling$^b$ | 42 | 15 | 27 | 0.18 | 0.11 | 0.07 | 40 | 18 | 22 | 19 | 1.27 |
| Non-Summer Floating$^b$ | (269) | (392) | 123 | (0.03) | 0.5 | (0.53) | 40 | 50 | (10) | 55 | 0.75 |
| Heating$^c$ | (599) | (464) | (135) | (0.82) | (0.64) | (0.18) | 40 | 25 | 15 | 26 | |
| Annual | | | | | | | | | | 37 | 1.08 |

$^a$The period between May 1 and Oct. 31.
$^b$The hours outside of the summer period when the outdoor air temperature falls within set parameters: Cooling >22° C.; Floating ≤22° C., ≥10° C.
$^c$The hours when the outdoor air temperature falls below 10° C.

The changes in loads were used to estimate energy savings and are shown in Table 3. These results assume a cooling and heating system with efficiency of seasonal energy efficiency ratio 3.8 cooling COP/COP 1 (coefficient of performance) (as was present in the laboratory buildings during later experimentation), 75% sensible heat ratio, and a 20% distribution loss.

Fan power is also converted into energy and summed annually in the Table 3. The smart ventilation scheme saves fan energy during the cooling when flows are lower, but uses more fan energy during the heating and especially the floating hours when flow is higher. The table shows potential for 26% annual energy savings, and over the 183-day period defined as summer in Central Florida (May 1-October 31), the Phase I system is estimated to save 1.3 kWh/day versus the constant speed ventilation system.

simulating occupancy by generating indoor sensible and latent loads, are provided elsewhere (Parker 2014). One building acted as a control, and utilized a fixed, continuous ventilation rate. The other building varied the ventilation rate with a fan operated with a smart controller via a programmable data logger.

Air leakage across the buildings' envelopes is controllable; however, for these experiments both buildings were set to their "tight" condition, resulting in approximately 2.2 air changes per hour (ACH) at 50 Pa. Under this condition, Standard 62.2 requires 35 L/s of whole-house mechanical ventilation fan flow, which was provided to the control building continuously, on a supply basis, directly into the zone via an inline fan. The 35 L/s is determined as the fan component of total continuous ventilation required by Standard 62.2, including natural infiltration modified by use of

TABLE 3

Simulated space conditioning energy use for the Phase I scheme and continuous ventilation.

| | Sensible (kWh) | | | Latent (kWh) | | | Fan (kWh) | | | Total Savings | |
|---|---|---|---|---|---|---|---|---|---|---|---|
| Season/Period | Fixed | Smart | Savings | Fixed | Smart | Savings | Fixed | Smart | Savings | (kWh) | % |
| Summer$^a$ | 140 | 39 | 101 | 397 | 318 | 65 | 175 | 121 | 54 | 233 | 33 |
| Non-Summer Cooling$^b$ | 20 | 7 | 13 | 21 | 13 | 8 | 44 | 20 | 24 | 45 | 52 |
| Non-Summer Floating$^b$ | | | | | | | 117 | 147 | (30) | (30) | −26 |
| Heating$^c$ | 232 | 180 | 52 | | | | 12 | 8 | 4 | 57 | 23 |
| Annual | 392 | 226 | 166 | 418 | 331 | 74 | 349 | 296 | 52 | 305 | 26 |

$^a$The period between May 1 and Oct. 31.
$^b$Hours outside of the summer period when the outdoor temperature falls within: Cooling >22° C., Floating ≤22° C., ≥10° C.
$^c$Hours when the outdoor air temperature falls below 10° C.

Phase I Laboratory Evaluation

Experimental work was conducted in FSEC's (Florida Solar Energy Center's) Flexible Residential Test Facility (FRTF), which features two full-scale, geometrically-identical side-by-side residential energy research facilities. The slab-on-grade buildings have uninsulated concrete block walls, single pane windows, RSI-5.3 (R-value Systeme International, a measure of thermal resistance) ceiling insulation, and COP 3.8 air conditioners with electric resistance heat. Additional characteristics of the 143 m$^2$ single-story buildings superposition to dictate interactive effects of the desired unbalanced ventilation system, as described in the ASHRAE Standard.

Components of the Phase I ventilation system in each home included a centrifugal inline fan, for which the maximum produced flow at full output was measured at 65 L/s once installed. Variation of airflow rates in the experimental building is achieved by altering the runtime of the inline fan with the programmable data logger as dictated by the smart ventilation algorithm. That is, the fan itself runs at its fixed, maximum speed while operating, but runtime is varied during each 15-minute period to match the total called-for flow. Temperature and RH are measured at the entrance and exit of the ventilation duct when the fan is running. Indoor temperature and RH measurements were taken near the thermostat and HVAC energy measurements were recorded.

Figure 2:
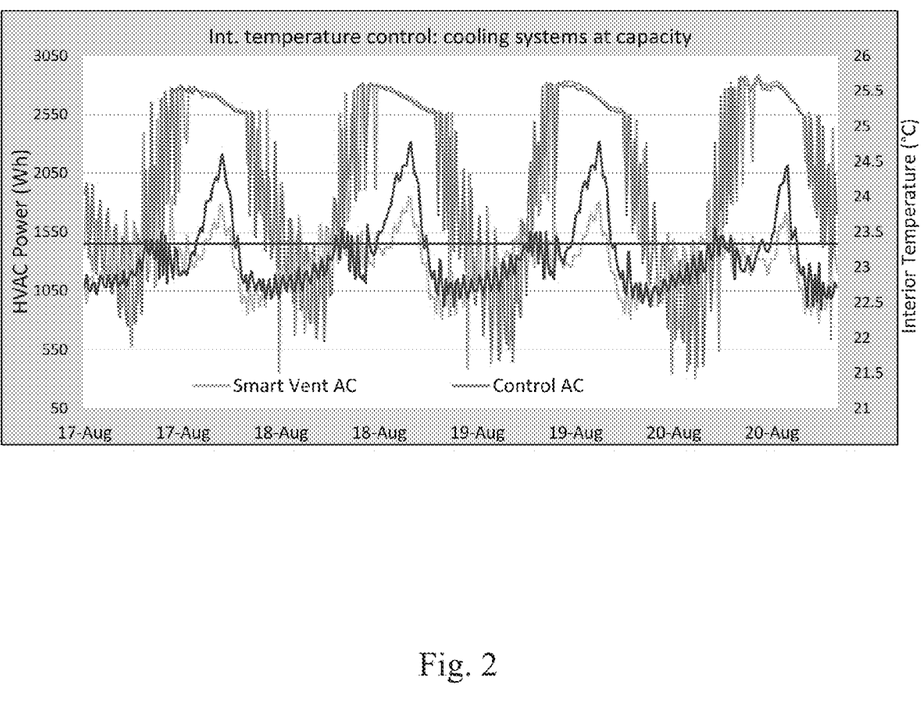
FIG. 2 is a graph of measured data from August showing lower indoor temperature achieved by the Phase I scheme compared to continuous ventilation despite air conditioners running at peak capacity.

One important finding during setup for the Phase I laboratory evaluation was that the outdoor air temperature measured at the ventilation air intake under the soffit was almost always warmer than the outdoor air temperature measured above roof height. Solar heating of the east wall under the air intake contributes to this temperature imbalance. Ventilation air entering the building is even warmer due to fan flow, and indoor and outdoor conditions in Table 5. The smart ventilation algorithm delivered 36 kWh/month or 1.2 kWh/day and 5.5% cooling energy savings for this 180-day period. Results are improved slightly to 6.2% when fan energy is considered. Average monthly savings ranged from 1% to 17%. The smallest cooling savings were experienced during the hottest months when air delivered by the smart ventilation system was less than that of the control. As shown in FIG. 2, during these months the air conditioner ran nearly constantly and sometimes failed to deliver the indoor set point temperature of 23.3° C. In August, the smart building with reduced ventilation is better able to maintain desired indoor conditions (yellow) than the control (red).

TABLE 4

Measured energy use during cooling and floating periods for the Phase I scheme and continuous ventilation.

| Month (n = days of good data) | Cooling Energy (kWh) | | | Fan Energy (kWh) | | | Total (kWh) | | | |
|---|---|---|---|---|---|---|---|---|---|---|
| | Fixed | Smart | Savings | Fixed | Smart | Savings | Fixed | Smart | Savings | % Savings |
| Aug. (n = 21) | 1,312 | 1,295 | 16 | 29 | 18 | 11 | 1,340 | 1,313 | 27 | 2% |
| Sep. (n = 15) | 1,011 | 1,013 | (2) | 29 | 18 | 10 | 1,039 | 1,031 | 8 | 1% |
| Oct. (n = 25) | 671 | 624 | 47 | 29 | 21 | 8 | 700 | 645 | 55 | 8% |
| Nov. (n = 9) | 295 | 246 | 49 | 29 | 25 | 3 | 324 | 271 | 53 | 16% |
| Dec. (n = 31) | 286 | 234 | 52 | 29 | 27 | 2 | 314 | 261 | 53 | 17% |
| Jan. (n = 15) | 300 | 248 | 53 | 29 | 25 | 3 | 329 | 273 | 56 | 17% |
| Average | 646 | 610 | 36 | 29 | 22 | 6 | 674 | 632 | 42 | 6.2% |

TABLE 5

Measured environmental conditions during cooling and floating periods for the Phase I scheme and continuous ventilation.

| Month (n = days of good data) | Smart Flow (L/s) | Smart RE | Outdoor OA Inlet Temp. (° C.) | Control Indoor Temp. (° C.) | Smart Vent Indoor Temp. (° C.) | Outdoor Air Inlet Dew Pt (° C.) | Control Indoor RH % | Smart Vent Indoor RH % |
|---|---|---|---|---|---|---|---|---|
| Aug. (n = 21) | 27 | 1.33 | 29.1 | 23.1 | 23.1 | 24.2 | 52.1% | 51.2% |
| Sep. (n = 15) | 28 | 1.31 | 27.5 | 23.1 | 23.3 | 23.1 | 53.1% | 53.9% |
| Oct. (n = 25) | 31 | 1.25 | 24.9 | 23.4 | 23.4 | 18.8 | 50.5% | 50.6% |
| Nov. (n = 9) | 39 | 1.08 | 21.3 | 23.3 | 23.4 | 15.6 | 50.9% | 53.3% |
| Dec. (n = 31) | 41 | 1.03 | 20.9 | 23.3 | 23.3 | 16.1 | 54.0% | 56.2% |
| Jan. (n = 15) | 39 | 1.06 | 18.5 | 23.5 | 23.3 | 12.2 | 48.3% | 52.8% | heat and gains on the outdoor air duct located in the vented attic. During July and August, average temperature at roof height (4.6 m), at the air intake (2.7 m), and the air discharge into the building were 26.9° C., 28.6° C., and 29.1° C. respectively. As outdoor air temperature is an input to the smart ventilation algorithm, these temperatures have implications on the application of weather station data, taken at height and supplied via an internet source, on a locally operating system.

Phase I Laboratory Results: 2016 Cooling and 2016-17 Floating Periods.

Measured monthly energy savings for the cooling and floating periods are provided in Table 4, and average RE, fan Phase II Scheme Description and Results In effort to achieve reduced RE, better energy savings, and improved indoor comfort conditions from the smart ventilation system, changes were made prior to the onset of the 2017 cooling season. A more powerful fan with a maximum flow of 99 L/s (tested in situ) was installed to allow greater ventilation flow during moderate outdoor conditions, and the simulation tool was revisited to test additional added parameters. Based on 2016 experiences, ventilation during the hottest periods with a limited cooling system capacity led to elevated indoor temperatures that would likely not be considered favorable. Thus, a key evaluated parameter included a fan lockout above 31° C. outdoor air temperature. A complete list of the Phase I/II parameters is in Table 6.

TABLE 6

Phase I and II scheme parameters and values

| Period (defined by hourly avg. outdoor Temp.) | Parameter | Phase I Scheme Values | Phase II Scheme Values |
|---|---|---|---|
| Cooling | Outdoor temp. range for cooling period target | >22° C. | >22° C. |
| | Cooling period target fan flow | 26 L/s | 35 L/s |
| | Outdoor temp. range for fan lockout (0 L/s) | n/a | ≥31° C. |
| Heating | Outdoor temp. range for heating period target | <15.5° C. | <15.5° C. |
| | Heating period target fan flow | 35 L/s | 35 L/s |
| Floating | Outdoor temp. range for floating period target | ≤22° C.; ≥15.5° C. | ≤22° C.; ≥15.5° C. |
| | Floating period target fan flow | 65 L/s (fan limit) | 99 L/s (fan limit) |
| | Outdoor W range to adjust floating period target | n/a | ≥15 g/m³ |
| | Floating period target adjusted for W | n/a | 35 L/s |
| All | Indoor temp. (T) | 18° C. | 18° C. |
| | Delta-temp. weight ($X_T$) | 2 | 2 |
| | Indoor moisture (W) | 12 g/m³ | 12 g/m³ |
| | Delta-moisture weight ($X_W$) | 1 | 1 |

Phase II Simulation Results

Figure 3:
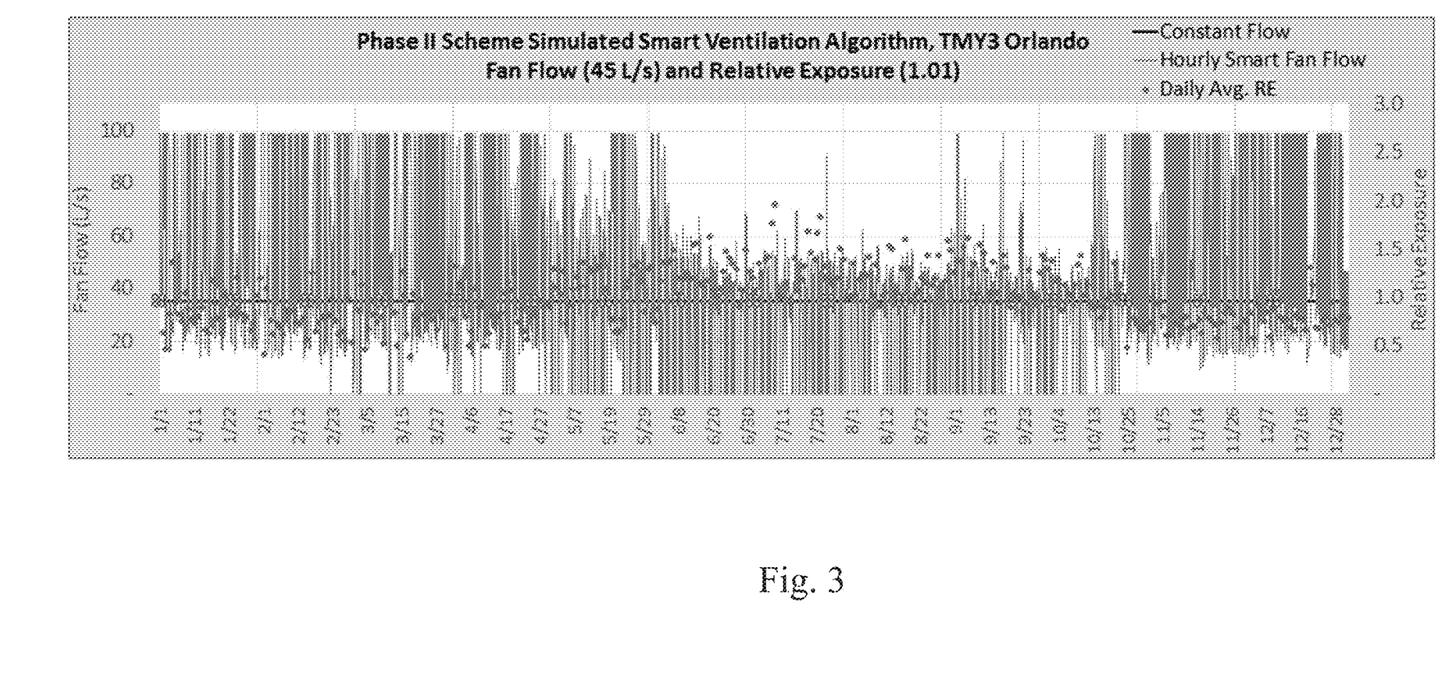
FIG. 3 is a graph of measured data from Phase II smart ventilation scheme simulated hourly average fan flow and daily average RE.

Simulation results for the Phase II smart ventilation scheme with TMY3 Orlando weather data suggested 45 L/s average annual fan flow, an increase from that of the Phase I smart ventilation scheme of 37 L/s. Total annual ventilation averaged 46 L/s. Along with the increased flow, results suggested an improved annual RE, which averaged 1.01 and reached a maximum of 3.63 for a single hour, still below the 5.00 threshold suggested by Standard 62.2. The Phase II Scheme simulation results are displayed graphically in FIG. 3.

Simulated seasonal differences in the sensible and latent ventilation loads between the constant fan and the Phase II smart ventilation scheme are presented for summer in Table 7. This simulation suggests the revised smart ventilation scheme reduces sensible cooling load by 97 W/hr and moisture load by 0.04 kg/h.

The Phase II ventilation loads and fan power are converted into energy impacts as shown in Table 8. The power use of the larger fan increased from 59 Watts to 114 Watts in the Phase II scheme. While this increase in fan energy will negatively impact overall savings, the primary intent of the experiments was to investigate impact of ventilation flow modulation.

TABLE 7

Simulated ventilation load and fan power for the Phase II scheme and continuous ventilation.

| | Sensible (W/h) | | | Latent (kg/h) | | | Fan Power (Average Watts) | | | Average Flow (L/s) | RE |
|---|---|---|---|---|---|---|---|---|---|---|---|
| Season/Period | Fixed | Smart | Δ | Fixed | Smart | Δ | Fixed | Smart | Δ | | |
| Summer[a] | 73 | (23) | 97 | 0.88 | 0.82 | 0.06 | 40 | 41 | (1.38) | 36 | 1.19 |
| Non-Summer Cooling[b] | 41 | 6 | 35 | 0.18 | 0.14 | 0.04 | 40 | 28 | 11.88 | 24 | 1.15 |
| Non-Summer Floating[b] | 2.70 | (504) | 234 | (0.03) | (0.01) | (0.02) | 40 | 80 | (40.46) | 69 | 0.66 |
| Heating[c] | 598 | (440) | 161) | (0.82) | (0.61) | (0.21) | 40 | 30 | 9.97 | 26 | 1.25 |
| Annual | | | | | | | | | | 45 | 1.01 |

[a]The period between May 1 and Oct. 31.

[b]The hours outside of the summer period when the outdoor air temperature falls within set parameters: Cooling >22° C.; Floating ≤22° C., ≥10° C.

[c]The hours when outdoor air temperature falls below 10° C.

TABLE 8

Simulated space conditioning energy use for the Phase II scheme and continuous ventilation.

| Season/Period | Sensible (kWh) | | | Latent (kWh) | | | Fan (kWh) | | | Total Savings | |
|---|---|---|---|---|---|---|---|---|---|---|---|
| | Fixed | Smart | Savings | Fixed | Smart | Savings | Fixed | Smart | Savings | (kWh) | % |
| Summer[a] | 140 | (46) | 186 | 397 | 380 | 17 | 175 | 181 | (6) | 196 | 28 |
| Non-Summer Cooling[b] | 20 | 3 | 17 | 21 | 16 | 5 | 44 | 31 | 13 | 35 | 41 |
| Non-Summer Floating[b] | | | | | | | 117 | 237 | (119) | (119) | −102 |
| Heating[c] | 232 | 170 | 62 | | | | 12 | 9 | 3 | 65 | 27 |
| Annual | 392 | 128 | 264 | 418 | 396 | 22 | 349 | 458 | (109) | 177 | 15 |

[a]The period between May 1 and Oct. 31.
[b]The hours outside of the summer period when the outdoor air temperature falls within set parameters: Cooling >22° C.; Floating <22° C., ≥10° C.
[c]The hours when the outdoor air temperature falls below 10° C.

Phase II Laboratory Results: 2017 Cooling Period

The Phase II scheme was implemented into the FRTF smart-controlled building May 1, 2017. Measured monthly energy savings are provided in Table 9, and average fan flow, RE, and indoor and outdoor conditions in Table 10. Although the results are limited to three months, the smart ventilation algorithm with the modified scheme and more powerful fan delivered savings far superior to the prior scheme, generating measured 12.4% AC savings in May (89 kWh/month, 3.0 kWh/day), 8.8% in June (73 kWh/month, 2.4 kWh/day), and 8.7% in July (88 kWh/month, 2.9 kWh/day), averaging 9.8% AC savings for the total period.

ings of the smart ventilation scheme are more pronounced during midday, when the outdoor temperature rises and the fan flow is reduced.

Simulated Results for Other Climates

To estimate the ability of the smart ventilation algorithm to reduce space conditioning energy in other climates, whole building energy simulations were conducted. The National Renewable Energy Laboratory's (NREL's) BEOpt™ software, which uses the EnergyPlus™ simulation engine, was used. NREL provided a customized input capability for BEOpt™ version 2.6.0.1 that allowed for hourly specification of total infiltration rate and fan energy. The FSEC FRTF

TABLE 9

Measured energy use during cooling and floating periods for the Phase II scheme.

| Month (n = days of good data) | Cooling Energy (kWh) | | | Fan Energy (kWh) | | | Total Energy (kWh) | | | % Savings |
|---|---|---|---|---|---|---|---|---|---|---|
| | Fixed | Smart | Savings | Fixed | Smart | Savings | Fixed | Smart | Savings | |
| May (n = 22) | 719 | 630 | 89 | 29 | 36 | (7) | 748 | 666 | 82 | 11.0% |
| Jun (n = 22) | 822 | 749 | 73 | 29 | 20 | 8 | 851 | 770 | 81 | 9.5% |
| Jul (n = 26) | 1,012 | 924 | 88 | 29 | 26 | 2 | 1,040 | 950 | 90 | 8.6% |
| Average | 851 | 768 | 83 | 29 | 27 | 1 | 880 | 795 | 84 | 9.6% |

TABLE 10

Measured conditions during cooling and floating periods for Phase II scheme.

| Month (n = days of good data) | Smart Flow (L/s) | Smart RE | Outdoor OA Inlet Temp. (° C.) | Control Indoor Temp. (° C.) | Smart Vent Indoor Temp. (° C.) | Outdoor Air Inlet Dew Point (° C.) | Control Indoor RH | Smart Vent Indoor RH |
|---|---|---|---|---|---|---|---|---|
| May (n = 22) | 43 | 0.99 | 24.7 | 24.4 | 2.4.4 | 4.2 | 49.1% | 50.4% |
| Jun (n = 22) | 34 | 1.10 | 26.8 | 24.4 | 24.6 | 15.6 | 52.3% | 52.4% |
| Jul (n = 26) | 31 | 1.27 | 1.27 | 24.4 | 24.5 | 16.3 | 49.0% | 49.3% |

The average indoor relative humidity in May was slightly higher in the smart building than the control, but overall the RH in the smart ventilation building was more closely aligned with that in the constant flow building than it was in Phase I.

Figure 4:
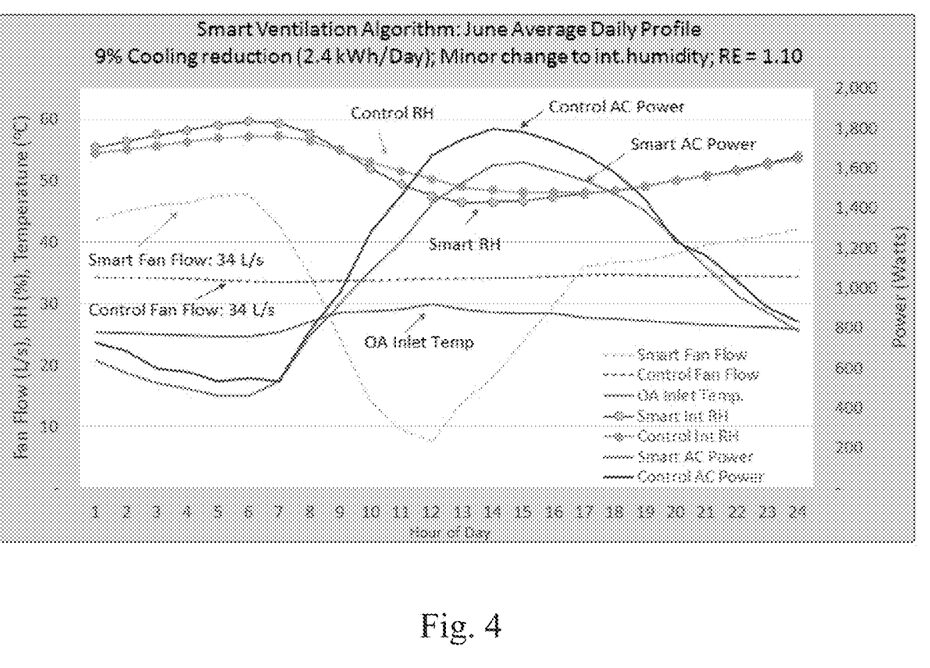
FIG. 4 is a graph of the June average day profile, which represents a summary of Phase II scheme performance.

The average daily profile for June is highlighted in FIG. 4, with ventilation scheme savings at 11.3%. The increased fan flow in the smart ventilation building during the morning hours has little impact on relative humidity while still achieving impressive energy savings. The AC energy savlaboratory was modeled to serve as the test building, with a few changes to envelope and mechanical system components to create a single building representative of average new construction in different climates. These include walls insulated to RSI 3.24 (K·m²/W), RSI-6.5 ceiling insulation, LOW-E argon fill windows, a $COP_{cool}$ 4.7$_{heat}$ heat pump, and a balanced ventilation system with no heat recovery.

Hourly total infiltration rate and fan energy were obtained using a developed simulation tool. TMY3 data was input for each of five representative climates, and algorithm parameters adjusted to ensure RE compliance. The parameters used for each climate are identical to the Phase II scheme values shown in Table 6, except for target flows and high/low temperature flow lockouts that were determined iteratively for each climate. The 62.2 Standard continuous mechanical ventilation flow for each climate was assigned for heating and cooling flow targets, and the 99 L/s flow limit of the Phase II laboratory fan was assigned for the floating target. Table 11 shows the simulated space conditioning energy for each climate modeled, along with the flow target used. Results show that across a variety of climates, space conditioning savings of >5% can be achieved with the simple approach used to set algorithm parameters. While increased fan energy for the smart ventilation scheme erodes savings, additional optimization of the fan choice could help maximize savings.

TABLE 11

Heating/cooling flow targets: energy savings & relative exposure for multiple climates.

| Location | Heating/ Cooling Flow Target (L/s) | Annual Average RE | Max Hourly RE | Annual Space Conditioning Energy Savings (kWh/%) | Annual Space Conditioning Energy + vent fan Savings (kWh/%) |
|---|---|---|---|---|---|
| Orlando, FL | 31 | 1.0 | 3.6 | 211/8.0% | 155/5.2% |
| Atlanta, GA | 30 | 1.0 | 3.6 | 182/5.4% | 117/3.2% |
| Minneapolis, MN | 28 | 1.0 | 3.2 | 777/5.8% | 753/5.5% |
| Chicago, IL | 29 | 1.0 | 3.2 | 621/6.9% | 592/6.3% |
| Phoenix, AZ | 31 | 1.0 | 3.3 | 311/6.8% | 229/4.6% |

Application to Residential Ventilation in Europe

Ventilation standards in Europe vary considerably across the European Union (EU) member states (Kunkel et al., 2018). Each country has its own ventilation standard, often integrated into energy standards. For example, in France and Belgium, buildings may use Demand Controlled Ventilation (DCV) using $CO_2$ and/or humidity sensing as a surrogate for occupancy and pollutant concentration to obtain credit in the energy code. Advances in sensor technology are now allowing control based upon Volatile Organic Compounds (VOCs) with a variety of smart ventilation approaches within European standards (Guyot, Walker and Sherman, 2018).

In the United Kingdom and Europe, ventilation compliance calculations tend to use room-by-room ventilation requirements rather than the total specified in 62.2 (Dimitroulopoulou, 2012). This is because it is not typical to connect all the rooms in homes with forced air ventilation systems in Europe. However, when evaluated on a whole building basis, the ventilation requirements usually are about 0.5 ACH (more than ASHRAE Standard 62.2). Older buildings in the EU typically use exhaust ventilation while newer construction often utilizes balanced mechanical ventilation with efficient Energy Recovery Ventilators (ERVs) that recover both sensible and latent heat. Another relevant difference in the European building stock is that new residential dwellings are often very tight and well insulated as the Passivhnms standards see increasing application.

Although a detailed assessment of the potential of a weather-responsive scheme is not possible due to variations due to prevailing standards and building types, we performed a preliminary assessment. Although the ERVs often used with high performance are quite efficient when rated at 0° C., their efficiency falls off steeply at temperatures below freezing given the need for defrost cycles. Thus, a weather-adaptive scheme has potential to significantly improve ERV effectiveness during winter conditions. During summer nights when outdoor conditions are potentially helpful to meet cooling loads, such a system can help to avoid more energy-intensive vapor compression air conditioning using ventilation without heat recovery. Also, most DCV strategies in the EU attempt to limit condensation potential and the described method can help limit outdoor moisture sources. Finally, within the minimization of the sum of square of deviation from ideal values, it is potentially possible to optimize multiple signals (e.g. temperature, enthalpy, $CO_2$ and/or VOC) at once.

In an illustration below, a high-performance home is simulated, based on the simulation work with the BEopt™ simulation outlined above, to evaluate Near Zero Energy Buildings (NZEBs) in Europe (D'Agostino and Parker, 2018). A very well insulated 119 m² building that is very tight (0.6 ACH @ 50 Pa) is assumed, but with mechanical ventilation to provide 0.5 ACH or 40.3 L/s constant in the base case. Because of the efficient ERV, the impact of ventilation loads sensible & latent are ~6 L/s if there had been no heat recovery. Simulated heating and cooling energy in Milan, Italy in the base case configuration showed a total heating and cooling energy budget of 12.9 kWh/m² (heating: 1280 kWh, cooling 261 kWh). Simulation parameters are provided in detail discussed in detail above.

Providing this target flow rate was examined in light of the resulting space heating and cooling energy savings when using the weather responsive scheme described above with the constraint that RE≥1.0. This case was simulated in five different European climates using hourly IWEC files: Frankfurt, Germany (cold), Lisbon, Portugal (mild), Milan, Italy (temperate), Stockholm, Sweden (very cold) and Seville, Spain (hot-arid). Given the tight building simulated, it was assumed that the flow of the ERV could only be reduced to 25% of the standard value (40 Us) during the "turn-down" conditions. Results are shown below:

TABLE 12

Heating/cooling flows, energy savings & relative exposure for European climates.

| Location | Heating/Cooling Flow Target (L/s) | Annual Avg & Max RE | Temp Turndown Heat/Cool | Annual Space Heating Energy Savings (kWh/%) | Annual Space Cooling Energy Savings (kWh/%) |
|---|---|---|---|---|---|
| Frankfurt, DEU | 40.3 | 1.0/4.9 | −2.3°/27.8° | 32/2.4% | 26/16.1% |
| Lisbon, PRT | 40.3 | 1.0/4.0 | 5.6°/27.8° | −9/−75.0% | 111/17.6% |
| Milan, ITA | 40.3 | 1.0/4.8 | −6.1°/28.3° | 37/2.9% | 44/16.9% |
| Stockholm, SWE | 40.3 | 1.0/4.8 | −9.4°/26.1° | 64/2.4% | 44/35.8% |
| Seville, ESP | 40.3 | 1.0/5.0 | 4.4°/32.2° | −9/−100.0% | 120/12.1% |

It will be noted from the results above that the savings are small in magnitude for heating given the efficiency of the ERVs and the very low level of space heating with the highly insulated building. Even so, an approximately 2-3% heating energy savings can be obtained in heating-dominated climates by shaping the introduction of ventilation air to the diurnal conditions outdoors. This savings estimate may be conservative since no effect of ERV defrost at temperatures below freezing was simulated. The results showed that the very efficient ERV served to reduce the heating savings of the weather-sensitive ventilation scheme.

The potential for cooling, however, was much greater. Reductions to space cooling are seen in all locations given the simulated ability of providing high levels of ventilation air during advantageous outdoor conditions in cooling-dominated climates such as Seville or Lisbon. Very small increases to heating are seen in such climates, but were dwarfed by the cooling energy savings which were large in magnitude.

CONCLUSIONS

A weather-adaptive algorithm for smart ventilation control was developed that interprets immediate and diurnal patterns of measurements of outdoor temperature and moisture and varies ventilation to minimize sensible and latent load impacts. Simulations were conducted to tune the algorithm with differing flow targets and seasonal adjustment factors to maximize heating and cooling energy savings compared to continuous ventilation. The scheme maintains similar indoor relative humidity, and Relative Exposure (RE) targets with respect to ASHRAE Standard 62.2. Simulation suggested that compliant annual average and acute RE could be maintained with 73% sensible and 9% latent load reductions during cooling conditions.

A ventilation system controlled by the present invention was implemented in one of two side-by-side identical laboratory test homes with the control home operating with continuous mechanical ventilation. Average cooling energy savings of 10% were measured during three months of evaluation due to the reduction in sensible and latent load created by the advanced controls. A fan with a maximum flow capacity three times greater than the continuous fan was required to achieve these savings. The experimental testing utilized sensor-based measurements of occupancy and weather parameters collected at the actual test homes, but commercialized systems could leverage both weather and interior data available from internet-connected devices such as smart thermostats.

Whole building energy simulations were conducted and predict at least 5% space conditioning energy savings across differing climates in the U.S. assuming the ventilation fan is optimized for energy savings. A preliminary analysis was also completed for several varied European climates using a highly insulated, tight residential building prototype with a very efficient ERV as the baseline. Analysis showed that the heating savings were much lower after accounting for the ERV efficiency—typically 2-3%. However, cooling energy savings remained significant—on the order of 12-36% and were potentially large in cooling-dominated climates.

REFERENCES

D'Agostino, D., Parker, D., "A framework for the cost-optimal design of nearly zero energy buildings (NZEBs) in representative climates across Europe," Energy, Volume 149, 15 Apr. 2018, pp. 814-829.

Dimitroulopoulou, C. (2012). "Ventilation in European Dwellings: A review," Building and Environment 47, pp. 109-125, January 2012.

Guyot, G. Walker, I. S. and Sherman, M. H., 2018, "Performance based approaches in standards and regulations for smart ventilation in residential buildings: a summary review," International Journal of Ventilation: DOI: 10.1080/14733315.2018.1435025.

Kunkel, S., Kontonasiou, E., Arcipowska, A., Mariottini, F and Atanasiu, B., 2015, Indoor Air Quality, Thermal Comfort and Daylight: Analysis of Residential Building Regulations in Eight EU Member States, Building Performance Institute Europe (BPIE), Brussels, March 2015.

Less, Brennan and Walker, Iain. 2016, Smart Ventilation Control of Indoor Humidity in High Performance Homes in Humid U.S. Climates. Ernest Orlando Lawrence Berkeley National Laboratory. LBNL-1006980, Berkeley, Calif.

Less, B., Walker, I., and Tang, Y. 2014. "Development of an Outdoor Temperature Based Control Algorithm for Residential Mechanical Ventilation Control." Lawrence Berkeley National Laboratory. LBNL-6936E, Berkeley, Calif.

Parker, D., Cummings, J., Vieira, R., Fairey III, P., Sherwin, J., Withers Jr., C., Hoak, D., and Beal, D. 2014. Flexible Residential Test Facility: Impact of Infiltration and Ventilation on Measured Cooling Season Energy and Moisture Levels, Golden, Colo. National Renewable Energy Laboratory. NREL/SR-5500-61012, January 2014.

Sherman, M. H.; Walker, I. S. 2011. "Meeting Residential Ventilation Standards through Dynamic Control of Ventilation Systems." Energy and Buildings, 43(8), 1904-1912.

Sherman, M. H., Walker, I. S., Logue, J. M. 2012. "Equivalence in ventilation and indoor air quality." HVAC & R Research, 18(4), pp. 760-773.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of optimizing ventilation flow rates, comprising:
measuring, for each hour of a twenty-three consecutive hour period, a numerical value corresponding to a difference in an outdoor temperature and an indoor temperature over the twenty-three consecutive hour period;
measuring, for each hour of the twenty-three consecutive hour period, a numerical value corresponding to a difference in an outdoor moisture level and an indoor moisture level over the twenty-three consecutive hour period;

calculating an average residual sum of squares value over the twenty-three consecutive hour period by calculating, for each hour of the twenty-three consecutive hour period, a residual sum of squares value based on the difference between indoor and outdoor temperatures for each hour and the difference between indoor and outdoor moisture levels for each hour and averaging the residual sum of squares values;

measuring, for an instantaneous hour-long period subsequent to the twenty-three consecutive hour period, an instantaneous residual sum of squares value based on a difference between an instantaneous indoor and outdoor temperature level and an instantaneous indoor and outdoor moisture level, and optimizing a ventilation flow rate by calculating a time-related fan flow equal to a target fan flow multiplied by a ratio of the average residual sum of squares value to the instantaneous residual sum of squares value, wherein, based on a determination that the instantaneous residual sum of squares value is greater than the average residual sum of squares value, the ventilation flow rate is optimized by slowing the time-related fan flow until a subsequent hour-long time period that is associated with a second instantaneous residual sum of squares value that is less than the average residual sum of squares value.

2. The method of claim 1, wherein the target fan flow is a cooling period target fan flow that is triggered when the instantaneous outdoor temperature level becomes greater than a cooling threshold temperature.

3. The method of claim 1, wherein the target fan flow is a heating period target fan flow that is triggered when the instantaneous outdoor temperature level becomes less than a heating threshold temperature.

4. The method of claim 1, wherein the target fan flow is a floating period target fan flow that is triggered when the instantaneous outdoor temperature level resides between a heating threshold temperature and a cooling threshold temperature.

5. The method of claim 1, further comprising a step of identifying whether an occupant is currently inside a building subject to an air conditioning system employing the steps of optimizing ventilation flow rates.

6. The method of claim 1, further comprising a step of assigning a 2:1 weight between the difference between indoor and outdoor temperatures and the difference between indoor and outdoor moisture levels, such that the average residual sum of squares value is time-weighted.

7. The method of claim 1, further comprising a step of measuring the outdoor temperature in an environment surrounding a building subject to an air conditioning system employing the steps of optimizing ventilation flow rates over the predetermined time period.

8. The method of claim 1, further comprising a step of measuring the outdoor moisture level in an environment surrounding a building subject to an air conditioning system employing the steps of optimizing ventilation flow rates over the twenty-three consecutive hour period.

9. The method of claim 1, further comprising a step of setting the target fan flow to zero based on a determination that the instantaneous outdoor temperature is greater than 30° C.

10. A method of optimizing ventilation flow rates, comprising:

measuring, for each hour of a twenty-three consecutive hour period, a temperature difference by:
   measuring an indoor temperature in a building employing the steps of optimizing ventilation flow rates over the twenty-three consecutive hour period;
   providing an average outdoor temperature in an environment surrounding the building over the twenty-three consecutive hour period; and
   calculating a difference between the indoor temperature and the outdoor temperature;

measuring, for each hour of the twenty-three consecutive hour period, a moisture level difference by:
   measuring an indoor moisture level in the building over the twenty-three consecutive hour period;
   providing an average outdoor moisture level in the environment surrounding the building over the twenty-three consecutive hour period; and
   calculating a difference between the indoor moisture level and the outdoor moisture level;

calculating an average residual sum of squares value over the twenty-three consecutive hour period by calculating for each hour of the twenty-three consecutive hour period, a residual sum of squares value based on the difference between indoor and outdoor temperatures for each hour and the difference between indoor and outdoor moisture levels for each hour, and averaging the residual sum of squares values;

measuring, for an instantaneous hour-long period subsequent to the twenty-three consecutive hour period, an instantaneous residual sum of squares value based on a difference between an instantaneous indoor and outdoor temperature level and an instantaneous indoor and outdoor moisture level; and optimizing a ventilation flow rate by calculating a time-related fan flow equal to a target fan flow multiplied by a ratio of the average residual sum of squares value to the instantaneous residual sum of squares value, wherein, based on a determination that the instantaneous residual sum of squares value is greater than the average residual sum of squares value, the ventilation flow rate is optimized by slowing the time-related fan flow until a subsequent hour-long time period that is associated with a second instantaneous residual sum of squares value that is less than the average residual sum of squares value.

11. The method of claim 10, wherein the target fan flow is a cooling period target fan flow that is triggered when the instantaneous outdoor temperature level becomes greater than a cooling threshold temperature.

12. The method of claim 10, wherein the target fan flow is a heating period target fan flow that is triggered when the instantaneous outdoor temperature level becomes less than a heating threshold temperature.

13. The method of claim 10, wherein the target fan flow is a floating period target fan flow that is triggered when the instantaneous outdoor temperature level resides between a heating threshold temperature and a cooling threshold temperature.

14. The method of claim 10, further comprising a step of identifying whether an occupant is currently inside a building subject to an air conditioning system employing the steps of optimizing ventilation flow rates.

15. The method of claim 10, further comprising a step of assigning a 2:1 weight between the difference between indoor and outdoor temperatures and the difference between indoor and outdoor moisture levels, such that the average residual sum of squares value is time-weighted.

16. The method of claim 10, further comprising a step of setting the target fan flow to zero based on a determination that the instantaneous outdoor temperature is greater than −30° C.

\* \* \* \* \*